United States Patent Office 3,293,170
Patented Dec. 20, 1966

3,293,170
PREPARATION OF HYDROCARBON CONVERSION CATALYSTS AND THEIR USE IN THE HYDRO-CRACKING OF HYDROCARBONS
Anthony George Goble and Paul Anthony Lawrance, both of Sunbury-on-Thames, Middlesex, England, assignors to The British Petroleum Company Limited, London, England, a company of England
No Drawing. Filed May 26, 1964, Ser. No. 370,358
Claims priority, application Great Britain, June 7, 1963, 22,787/63
14 Claims. (Cl. 208—111)

This invention relates to the preparation of hydrocarbon conversion catalysts and their use for such conversion, particularly for the hydrocatalytic treatment of hydrocarbons to cause breakdown to lower boiling materials, an operation now commonly referred to as "hydrocracking."

Hydro-cracking is a well known process which has been investigated and used in the field of petroleum refining to increase the production of lower boiling fractions, particularly gasoline fractions. It has, for example, been used in Europe for aviation gasoline production, being then normally referred to as "destructive hydrogenation" or "splitting hydrogenation." Interest subsequently declined, but it has been recently re-aroused, with particular emphasis on processes which result in products with high iso- to normal- paraffin ratios.

The catalysts used normally have one or more hydrogenating components, for example a metal or metal compound from Groups VI$a$ and VIII of the Periodic Table, on an acidic support and various hydrogenating metals have been proposed in combination with various supports.

Experiments have now shown that when a hydrogenating metal is added to a catalyst support by impregnation in conventional manner a considerable proportion of the metal is not chemically bound to the support. This unbound metal is believed to exist in the finished catalyst as crystalline aggregations of the metal. Experiments have also shown, however, that hydrogenating metals can be chemically bound to the support and when in this form they are believed to exist as individual atoms associated with active sites on the support. This difference in the method of association of the metal with the support not only has a direct bearing on methods of catalyst preparation but also on the activity and characteristics of the finished catalysts.

The present invention is concerned with a method of catalyst preparation in which substantially only chemically-bound metals are retained on the catalyst and with the use of such catalysts.

According to the present invention a method of preparing a catalyst suitable for hydrocarbon conversion comprises impregnating a refractory oxide support with a compound of a hydrogenating metal from Groups VI$a$ and VIII of the Periodic Table, washing the impregnated support with water to remove substantially all the metal cations not chemically bound to the support and drying the water-washed support.

If the compound used for impregnation also contains anions, as example when it is a salt, the water washing will also remove these anions. This may also contribute to the activity of the catalyst since certain anions, for example sulphate ions, are known to suppress catalyst activity.

The water used for washing is desirably free from ions other than those already present on the catalyst and initially, therefore, de-ionised water may be used. Removal of substantially all metal cations not chemically bound to the support will occur when the washing is continued until no further cations are removed from the catalyst. This can readily be determined by analysis of the effluent from the washing. Other conditions for the washing are not critical, affecting only the speed of the catalyst preparation rather than the final result. Suitably the temperature may be in the range 15° C. to the boiling point of water at the pressure used, preferably 15 to 100° C. Atmospheric pressure is preferred, but pressures above or below atmospheric are also suitable. The quantity of water used is suitably 10 ml. to 1000 ml. per ml. of catalyst and the length of time of the washing may be from ½ hr. to 100 hours. A particularly suitable form of washing is by extraction on the Soxhlet principle.

The support which is impregnated according to the present invention is prepared before the addition of the hydrogenating metal. Preparation of a support normally involves formation of a hydroxide, drying of the hydroxide to remove excess water and finally calcination of the hydroxide to the oxide. The term "refractory oxide support" includes the dried hydroxide as well as the calcined oxide, but excludes the so called hydrogels or hydrosols containing excess water. The support may be formed into particles of a suitable size and shape at any convenient point in the preparation, but preferably before the addition of the metal.

The support may comprise one or more refractory oxides from Groups II to IV of the Periodic Table, for example magnesia, boria, alumina, silica and titania.

Particularly suitable supports are mixed oxides of silica and alumina or silica and magnesia in which the silica is present in an amount of more than 50% wt. by weight of the support, preferably 50 to 95% wt. Other suitable supports are those consisting of alumina or those in which alumina is present in an amount of from 50 to 95% wt. by weight of the support, the alumina being mixed with from 50 to 5% wt. of another oxide, particularly silica or boria. The support may also contain up to 15% wt. of a halogen, for example fluorine, or chlorine.

Theoretically refractory oxides such as alumina are chemically neutral and incapable of combining with metal cations. However in practice, the refractory oxides normally used in catalyst preparation contain active sites on their surface which are acidic in nature, and various techniques exist for determining whether such sites are present and for determining their strength. Examples of suitable techniques are the benzene chemisorption technique described by Pitkethly and Goble in "Actes du Deuxieme Gongres International de Catalyse" Paris 1960, volume 2, page 1851 and the electron spin resonance technique described by Rooney and Pink in "Proceedings of the Chemical Society," February 1961, at page 70 and in "Transactions of the Faraday Society," vol. 58, August 1962 at page 1362. If necessary the ability of a given refractory oxide to combine chemically with a hydrogenating metal cation can be determined by a simple preliminary experiment.

The total amount of metal added by weight of total catalyst will depend on the number of active sites which may be a function both of the chemical nature of the support and of its surface area.

In general with the known refractory oxides the amount is likely to be within the range 0.01 to 5% wt. by weight of total catalyst more particularly 0.1 to 2.5% wt. The amount of metal originally added by impregnation is not critical since the subsequent washing removes the excess which is not chemically bound to the support. However it is obviously wasteful to use a large excess, so that the preferred quantity originally added does not exceed 10% wt.

The preferred hydrogenating metals are the iron group metals, particularly nickel and the platinum group metals particularly platinum and palladium.

After the addition of the hydrogenating metal and the washing the catalyst is dried and, preferably, calcined. It may also be reduced in an atmosphere of hydrogen before use.

The catalysts prepared according to the present invention may be used in any hydrocarbon conversion reaction known to be catalysed by catalysts having a Group VI$a$ or VIII hydrogenating component on a refractory oxide support. Reactions known to be catalysed by such catalysts include dehydrogenation, dehydrocyclisation, hydrogenation, isomerisation, and hydrocracking. Preferred feedstocks for these reactions are petroleum fractions and the preferred process conditions for any given reaction may be determined by experiment.

However, due, it is believed, to the fact that the hydrogenating metal is present as individual atoms and not in bulk as with conventional impregnation techniques, certain aspects of catalyst activity are markedly different from conventional catalysts. Thus a catalyst impregnated in bulk with an iron group metal, particularly nickel, cracks by demethylation, that is by successive removal of methyl groups. Nickel catalysts of the present invention, on the other hand, crack without demethylation. To prevent demethylation with conventional catalysts it is necessary to have sulphur present, but this is not necessary with the present catalyst. It is thus capable of cracking sulphur free feedstocks without demethylation. The presence of sulphur is also stated to be necessary with conventional catalysts to give high iso- to normal ratios in cracked products but again this is not so with the present catalysts.

On the other hand, the presence of sulphur is not deleterious to the present catalysts and they can be used to process sulphur containing feedstocks. They thus have a greater degree of versatility, particularly for the preferred use which is hydro-cracking.

The hydro-cracking process may be used for the treatment of higher boiling petroleum fractions with the emphasis either on the production of gasoline or the so-called middle distillates (i.e. fractions boiling within the range 150 to 370° C.).

The process conditions for the hydro-cracking may be chosen from the following ranges:

Temperature _____ 500–850° F., preferably 600 to 850° F.
Pressure _____ 500–5000 p.s.i.g., preferably 1000 to 2000 p.s.i.g.
Space velocity _____ 0.1–10 v./v./hr., preferably 0.2 to 5 v./v./hr.
Gas rate _____ 500–20,000 s.c.f. $H_2$/b., preferably 5000 to 15,000 s.c.f./b.

Feedstocks for the hydro-cracking are preferably petroleum fractions, suitably boiling above 150° C. and more particularly boiling within the range 150–600° C. (i.e. the gas oil and wax distillate fractions of a crude oil). Either gas oil (150–350° C.) or wax distillate (350–600° C.) may be used for gasoline producing processes; wax distillate is preferred for middle distillate producing processes, since gas oil is a desired product of the process. The feedstocks may be either derived directly from crude oil or they may be the products of previous conversion processes, for example products from thermal or catalytic cracking. As with other hydro-cracking processes, it may be necessary to use feedstocks with a low nitrogen content and/or to remove nitrogen compounds from gas which is recycled. This applies particularly to catalysts from high cracking activity such as are preferred for gasoline production. Any of the known processes of denitrogenation may be used to pre-treat nitrogen containing feedstocks, a hydrocatalytic treatment being preferred.

The nitrogen content of feedstocks to the hydrocracking may be not more than 50 p.p.m., more particularly not more than 25 p.p.m.

The total product may be separated by distillation into a lower boiling fraction and an unconverted fraction and the latter may be recycled if desired.

A hydrocatalytic pre-treatment for nitrogen removal is likely to desulphurise the feedstock also, but a particular feature of the catalyst of the present invention is as stated above, its independence of the presence or absence of sulphur.

The invention is illustrated by the following examples.

*Example 1*

120 ml. of ⅛″ x ⅛″ pelleted silica-alumina cracking catalyst (12.5 percent alumina) were packed into a column and treated with 1 litre of 0.5 molar nickel nitrate solution at a temperature of 80° C. in 3 hrs. The catalyst was then washed with 2½ litres of deionised water at room temperature in 2½ hours, and dried by blowing air through the heated catalyst bed. When dry the appearance of the pellets was grey-green.

The apparatus used for metal salt addition consisted of two condensers joined together and used as a vertical column, with a sintered glass plate fused in near the bottom to support the catalytic material. The total volume was about 150 ml. Water was circulated through the outer jackets of the condensers from a thermostatically controlled water bath, to effectively control the temperature of the catalyst bed at any desired level.

100 ml. of this dried, nickel impregnated catalyst, were charged to a Soxhlet apparatus and extracted with deionised water for 16 hours. The catalyst was then dried in a forced air oven at 130° C. for 4 hours, and calcined in a muffle furnace for 3 hours at 550° C.

After calcination the pellets were a pale brown colour, and the nickel content was 1.2% wt.

The catalyst was reduced in hydrogen at 800° F. and tested for hydro-cracking activity and selectivity by contacting 75 ml. of the catalyst with a hydrofined wax distillate (boiling range 350°–550° C., sulphur content=0.15 percent weight, nitrogen content 0.0045 percent weight) under the following conditions:

Pressure, p.s.i.g. _____ 1,000
Temperature, ° F. _____ 600–850
Space velocity, v./v./hr. _____ 1.0
Once-through hydrogen rate, s.c.f./b. _____ 10,000
Conversion=percent weight material produced boiling below 204° C.

$$\text{Selectivity} = \frac{\text{percent weight material produced boiling from } C_5\text{–}204°\ C. \times 100}{\text{percent weight material produced boiling below } 204°\ C.}$$

The temperature for 50% wt. conversion was 720° F. and the selectivity at 50% conversion was 84.5%. Comparative hydro-cracking tests were also carried out with the following catalysts.

A catalyst having 7.3% wt. of nickel on the same silica-alumina support prepared by impregnating the support with an ammoniacal solution of nickel formate, drying at 120° F. calcining in air at 1300° F. and reducing in hydrogen at 800° F.

A catalyst having 5.98% wt. of nickel, 8.03% wt. of tungsten and 1.96% wt. of fluorine on the same silica-alumina support again prepared by impregnation.

Although both these catalysts had hydrogenating metals present in amounts several times that of the ion-exchanged nickel catalyst the hydro-cracking activity and selectivity was not markedly different as shown by the following results.

| Catalyst | Temperature for 50% wt. conversion, °F. | Selectivity at 50% wt. conversion, percent |
|---|---|---|
| Ion-exchanged Ni on Si-Al | 720 | 84.5 |
| Ni on Si-Al | 705 | 82 |
| Ni-W-F on Si-Al | 735 | 90 |

*Example 2*

1500 gm. of silica-alumina cracking catalyst (12.5% wt. $Al_2O_3$) were soaked in a 2 molar solution of nickel nitrate (5 liters) for 24 hours, being stirred continuously. After vacuum filtration, the solid was washed exhaustively with water by decantation and filtration at ambient temperature. The powder was then dried at 120° C., prior to pelleting and granulation. The nickel content was 0.28% weight.

50 ml. of this catalyst were then used to process sulphur- and nitrogen-free n-octadecane under the following conditions:

Space velocity, v./v./hr. _____ 1.0
Pressure, p.s.i.g. _____ 1000
Gas rate (once through), s.c.f./b. _____ 10,000
Pre-reduction in hydrogen—2 hours at 800° F.

The temperatures used and the results obtained are shown in the table below.

| Test Period No. | Feed | 1 | 2 |
|---|---|---|---|
| Temperature, °F | | 545 | 587 |
| Liquid Recovery, percent wt | | 95.0 | 80.4 |
| Total Recovery, percent wt | | 100.5 | 100.4 |
| Analysis of Total Product: | | | |
| $C_1$, percent wt | | None | None |
| $C_2$, percent wt | | | |
| $C_3$, percent wt | | 1.6 | 9.9 |
| $C_4$, percent wt | | 6.8 i/n 5.2 | 19.9 i/n 3.4 |
| $C_5$, percent wt | | 6.8 i/n 12.6 | 19.9 i/n 12.3 |
| $C_6$, percent wt | | 7.5 i/n 17.7 | 18.4 i/n 11.3 |
| $C_7$, percent wt | | 6.1 i/n 19.3 | 12.2 i/n 11.2 |
| $C_8$, percent wt | | 4.5 | 6.5 |
| $C_9$, percent wt | | 2.2 | 2.3 |
| $C_{10}$, percent wt | | 2.5 | 1.9 |
| $C_{11}$, percent wt | | 1.6 | 1.1 |
| $C_{12}$, percent wt | | 1.4 | 0.7 |
| $C_{13}$, percent wt | | 1.2 | 0.4 |
| $C_{14}$, percent wt | 0.1 | 0.5 | 0.2 |
| $C_{15}$, percent wt | 0.1 | 0.1 | |
| $C_{16}$, percent wt | 0.1 | 0.5 | 0.1 |
| $C_{17}$, percent wt | 4.2 | 4.2 | 0.8 |
| $C_{18}$, percent wt | 95.5 | 52.5 | 5.7 |
| Total conversion of n-$C_{18}$, percent wt | | 44.8 | 93.8 |

The table shows not only the high conversion obtainable with a catalyst containing only 0.28% wt. of nickel, but also the high iso to normal ratios in the $C_4$ to $C_7$ fractions. The products were substantially completely saturated, again despite the low nickel content of the catalyst.

We claim:

1. A method of preparing a catalyst suitable for use in the conversion of hydrocarbons comprising impregnating a refractory oxide support with a water-soluble compound of an iron group hydrogenating metal to chemically bond metal cations of said compound to said support, the support being prepared before the addition of the hydrogenating metal compound and comprising at least one refractory oxide selected from the group consisting of magnesia, boria, alumina, silica, and titania and mixtures of the foregoing, thereafter washing the impregnated support with water to remove substantially all of the metal cations of the water-soluble compound not chemically bound to the support, and drying the water-washed support.

2. A method as claimed in claim 1 wherein the temperature of the washing is from 15° C. to the boiling point of water at the pressure used.

3. A method as claimed in claim 2 wherein the pressure is atmospheric and the temperature 15 to 100° C.

4. A method as claimed in claim 1 wherein the support consists of from 50 to 95% wt. of silica and 50 to 5% wt. of alumina.

5. A method as claimed in claim 1 wherein the iron group metal is nickel.

6. A method as claimed in claim 1 wherein the hydrogenating metal content is from 0.01 to 5% wt. by weight of total catalyst.

7. A process as claimed in claim 1 wherein the support is calcined before impregnation.

8. A process as claimed in claim 1 wherein the catalyst is calcined after the water washing and drying.

9. A process for the conversion of hydrocarbons comprising contacting a hydrocarbon feedstock in a reaction zone under conversion conditions of temperature and pressure with a catalyst, said catalyst being prepared by impregnating a refractory oxide support with a water-soluble compound of an iron group hydrogenating metal to chemically bond metal cations of said compound to said support, the support being prepared before the addition of the hydrogenating metal compound and comprising at least one refractory oxide selected from the group magnesia, boria, alumina, silica, and titania and mixtures of the foregoing, thereafter washing the impregnated support with water to remove substantially all of the metal cations of the water-soluble compound not chemically bound to the support and drying the washed support, and recovering the treated hydrocarbon feedstock.

10. A process as claimed in claim 9 wherein the conversion process is a hydro-cracking process operated at 500 to 850° F., 500 to 5000 p.s.i.g., 0.1 to 10 v./v./hr. and 50 to 20,000 s.c.f. of hydrogen/b.

11. A process as claimed in claim 10 wherein the temperature is 600 to 850° F.

12. A process as claimed in claim 10 wherein the pressure is 1000 to 2000 p.s.i.g., the space velocity 0.2 to 5 v./v./hr. and the gas rate 5000 to 15,000 s.c.f./b.

13. A process as claimed in claim 10 wherein the feedstock is a petroleum fraction boiling above 150° C.

14. A process as claimed in claim 13 wherein the petroleum fraction boils within the range 150 to 600° C.

References Cited by the Examiner

UNITED STATES PATENTS

| 2,356,576 | 8/1944 | Free et al. | 208—111 |
| 3,008,895 | 11/1961 | Hansford et al. | 208—112 |
| 3,152,091 | 10/1964 | Gring | 208—112 |

OTHER REFERENCES

"Techniques of Catalyst Preparation," Symposium Sponsored by Division of Petroleum Chem. of the Am. Chem. Society, held at Dallas, Texas, April 8–13, 1956, Article on Preparation and Properties of Catalysts, by Folkins et al., page 6, last paragraph.

DELBERT E. GANTZ, *Primary Examiner.*

A. RIMENS, *Assistant Examiner.*